United States Patent [19]
Cramer

[11] 3,943,600
[45] Mar. 16, 1976

[54] APPARATUS AND PROCESS FOR CUTTING CHICKEN

[75] Inventor: Clarence W. Cramer, Burlington, N.J.

[73] Assignee: Campbell Soup Company, Camden, N.J.

[22] Filed: May 6, 1974

[21] Appl. No.: 467,002

[52] U.S. Cl. .................................. 17/11; 17/52
[51] Int. Cl.² ..................................... A22C 21/00
[58] Field of Search .................. 17/11, 52, 57, 54

[56] References Cited
UNITED STATES PATENTS

| | | | |
|---|---|---|---|
| 3,241,179 | 3/1966 | Schlichting | 17/52 |
| 3,319,284 | 5/1967 | Schlichting | 17/52 |
| 3,639,945 | 2/1972 | Duncan et al. | 17/11 |
| 3,675,272 | 7/1972 | Schacht | 17/11 |

Primary Examiner—Robert Peshock
Attorney, Agent, or Firm—John W. Logan, Jr.

[57] ABSTRACT

Apparatus and processes are disclosed which will automatically separate a whole dressed and eviscerated chicken into its usable component parts of wings, legs, thighs and breasts and discharge the remaining carcass consisting of the backbone and rib cage into a container. The apparatus includes conveying means which supports and transports chickens along a predetermined path. A pair of movable cutting blades are provided to swing in toward the chicken and cut the wings away from the carcass. Thereafter, a pair of swinging jaws engage and pull the breast off of the carcass. As the carcass continues movement along the conveyor, guide means engage the legs of the carcass and direct the legs toward cutting blades which cut the legs from the thighs at the leg joint. Thereafter, cutting blades partially cut through the carcass at the thigh joint and jaws then grip the thighs and pull and twist the thighs simultaneously to remove the same from the carcass. The remaining carcass is discharged into a container or onto some suitable conveying means while separate conveying means are provided to receive and convey the individual components of the chicken to further inspection and processing apparatus.

30 Claims, 19 Drawing Figures

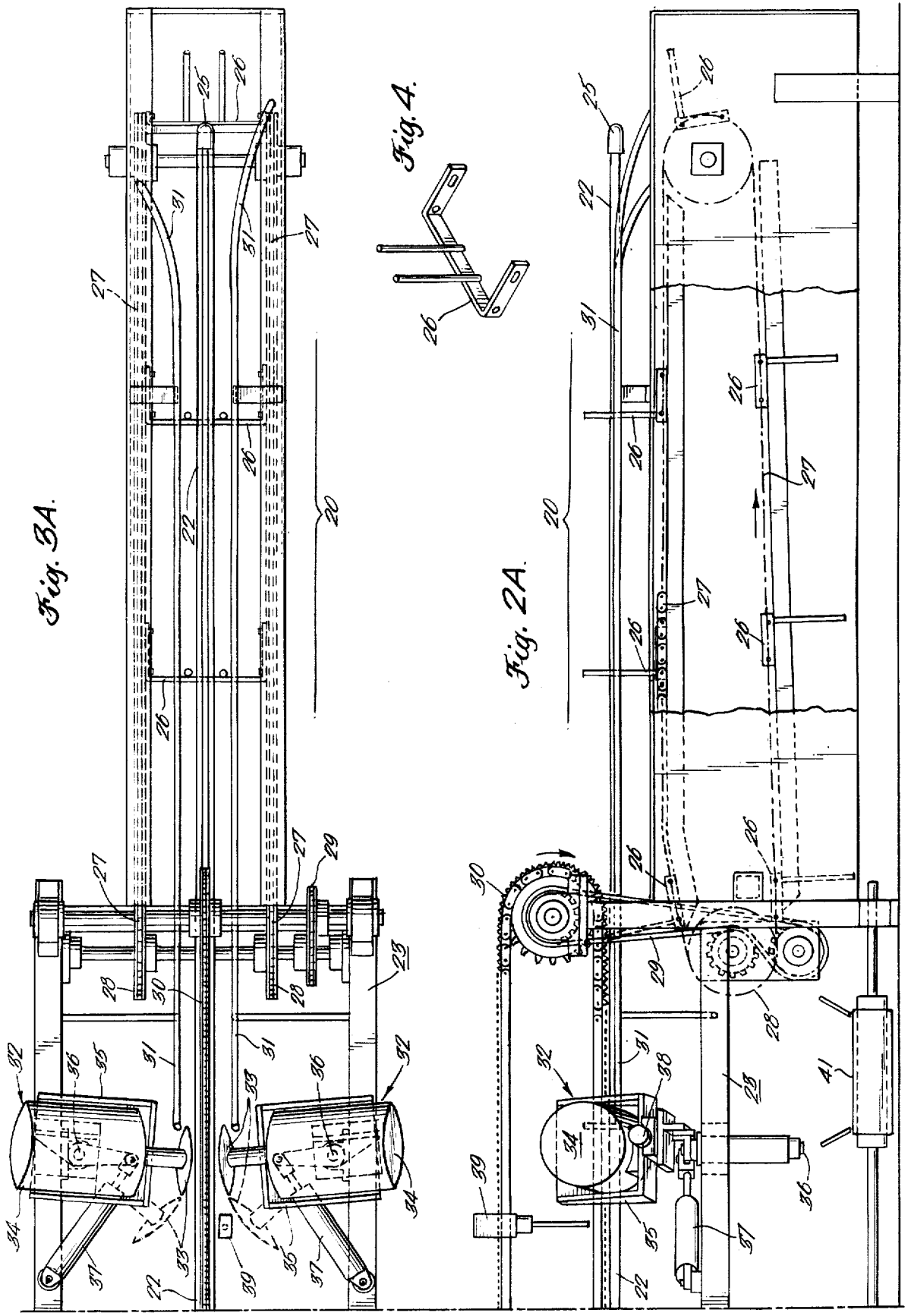

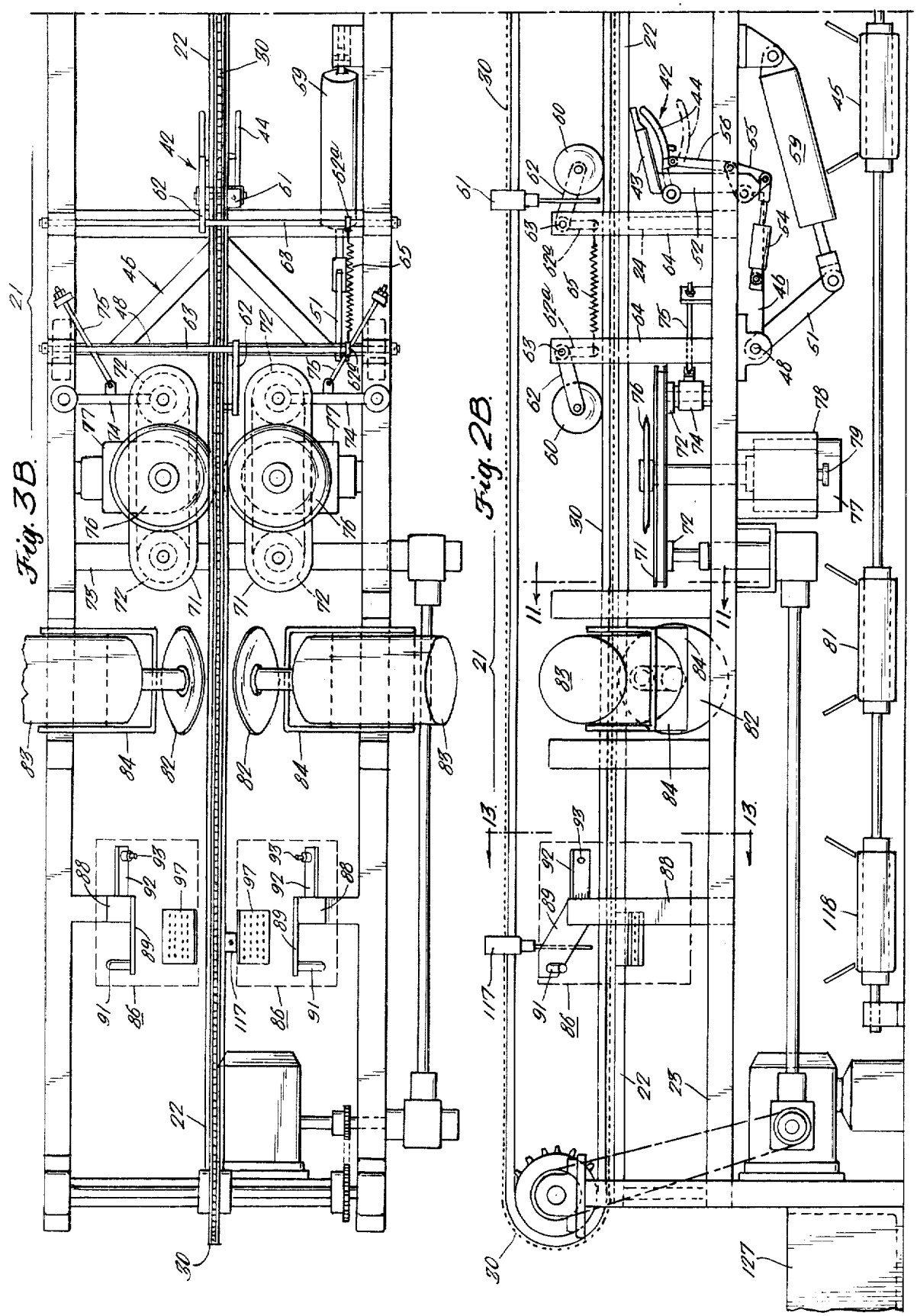

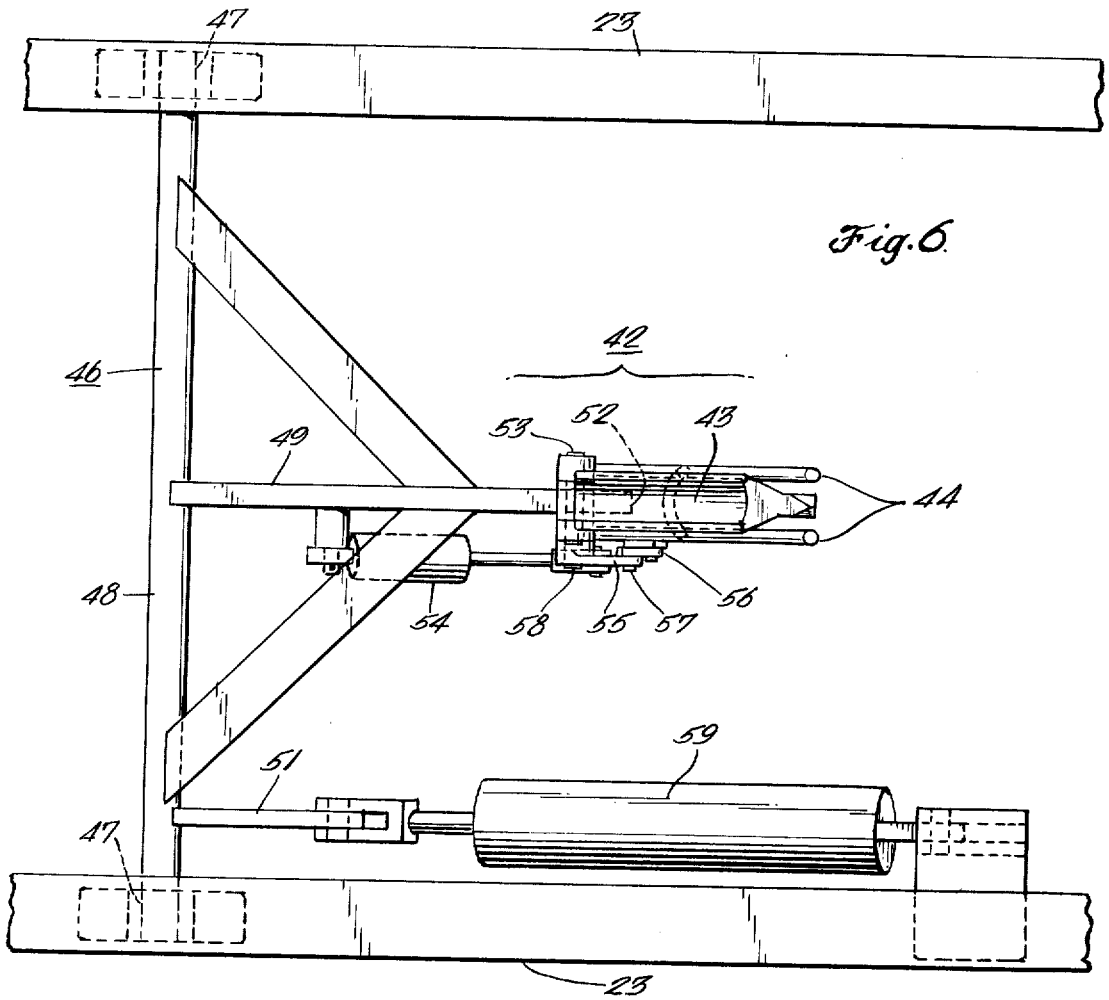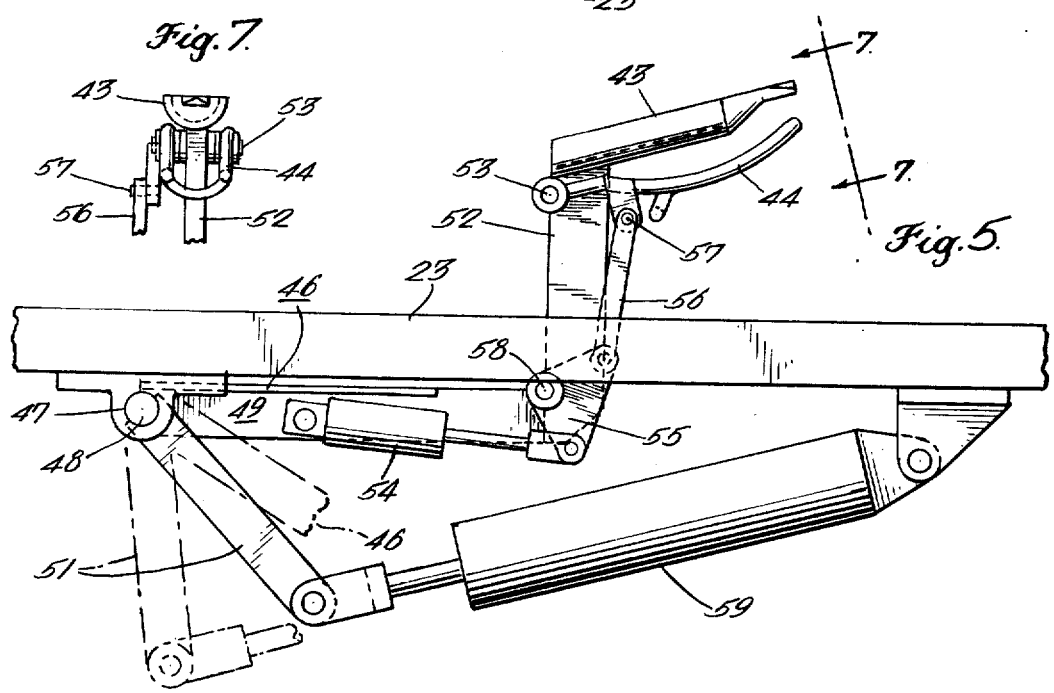

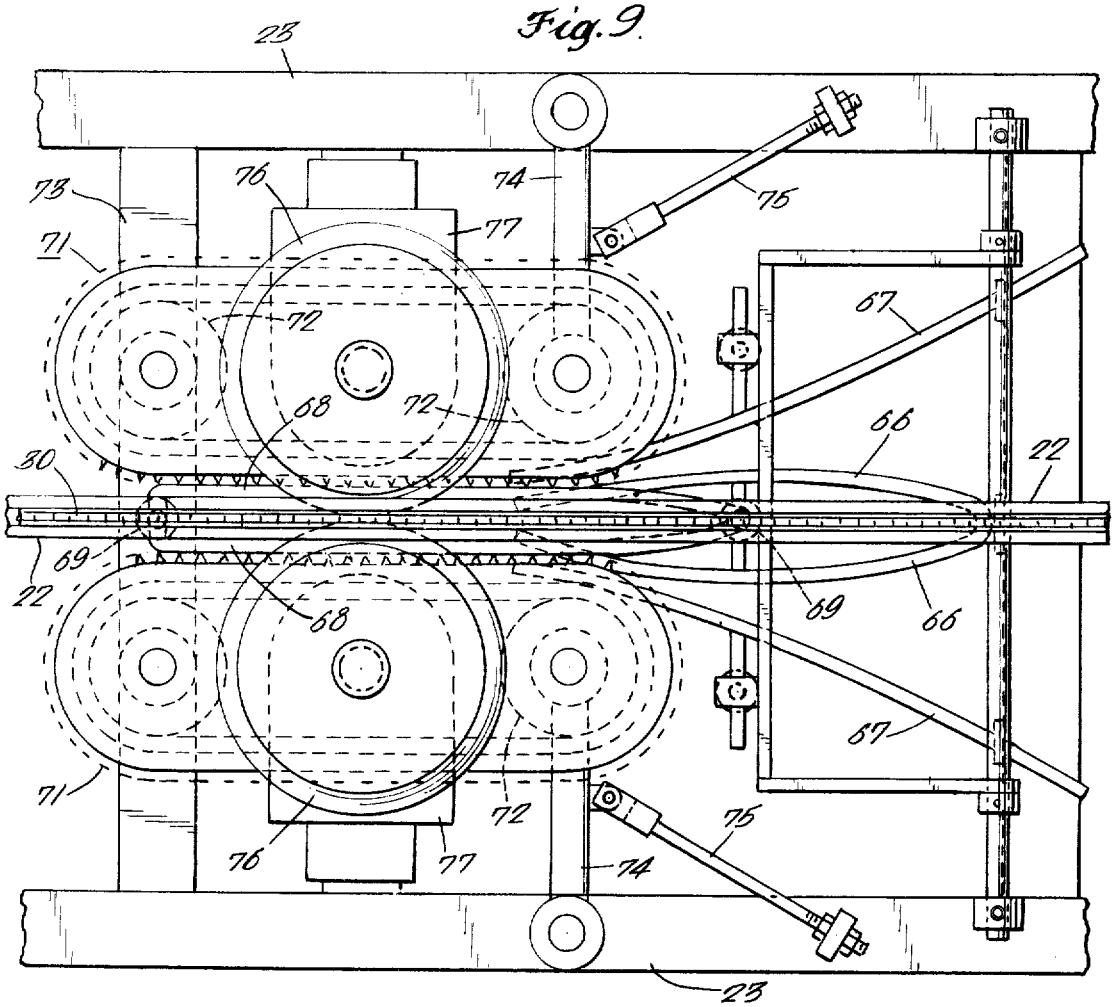
Fig. 9.
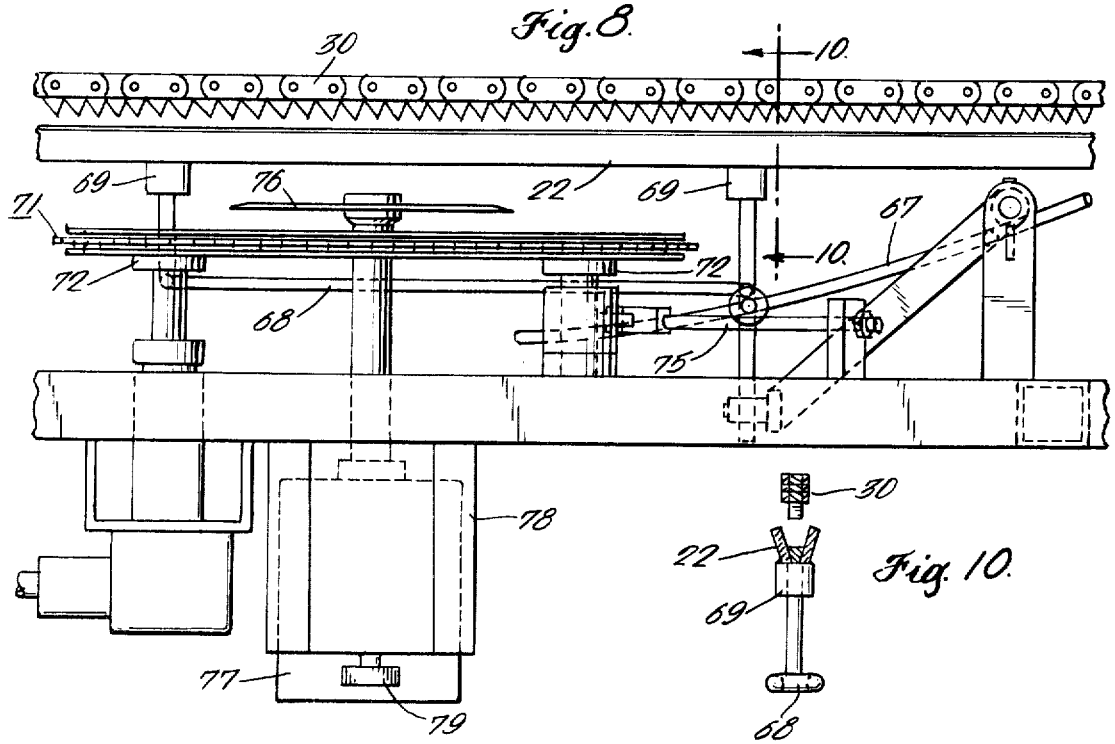
Fig. 8.
Fig. 10.

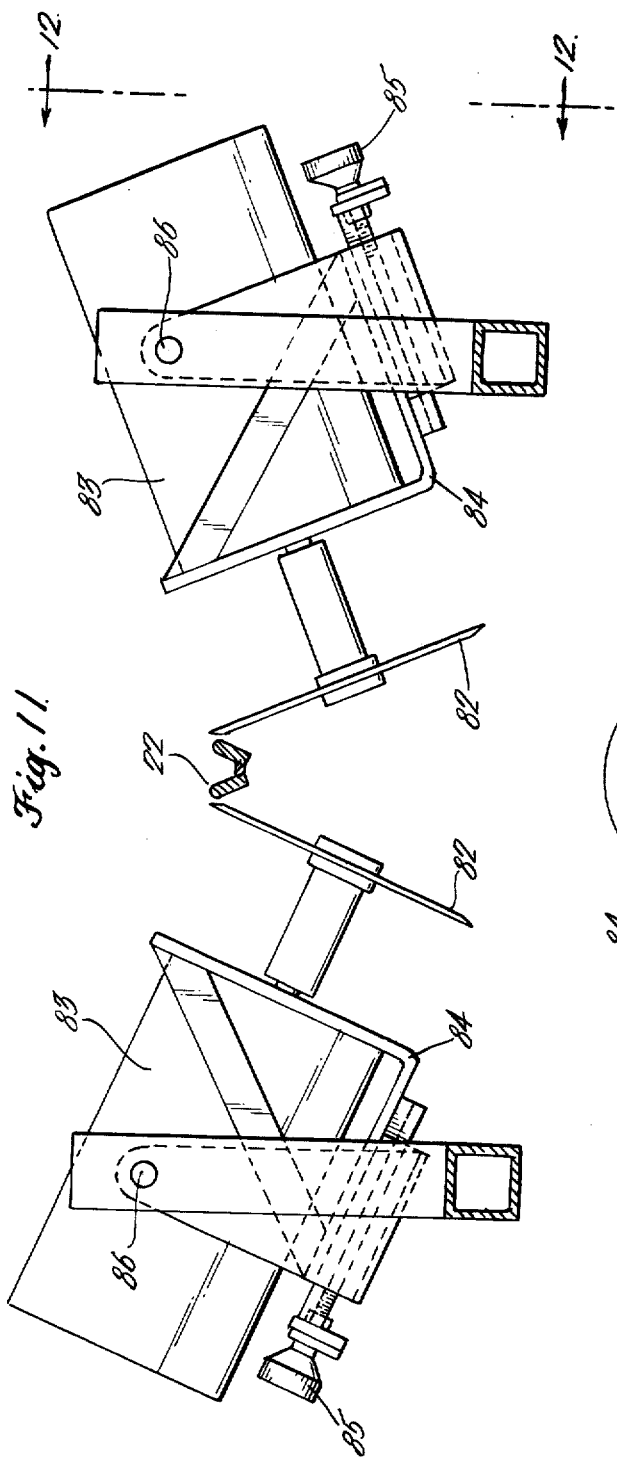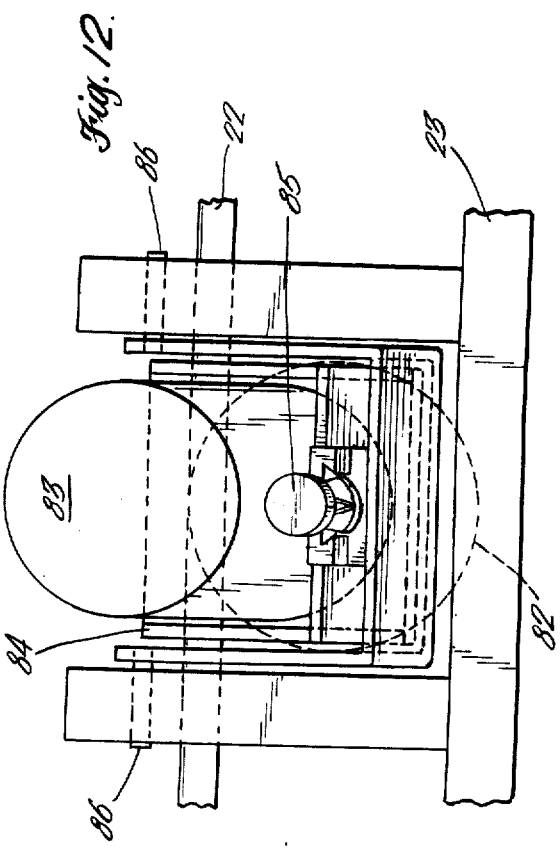

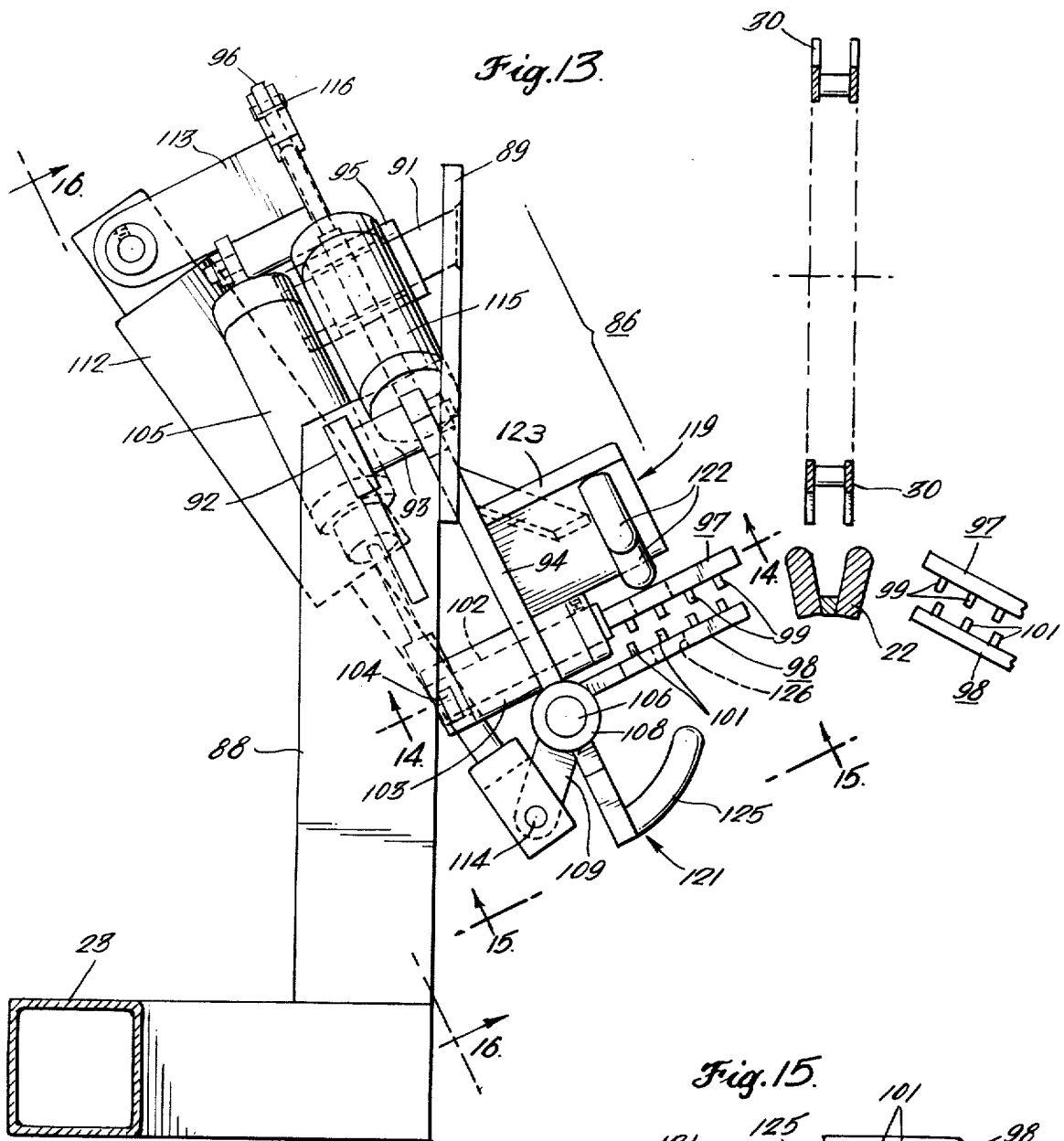

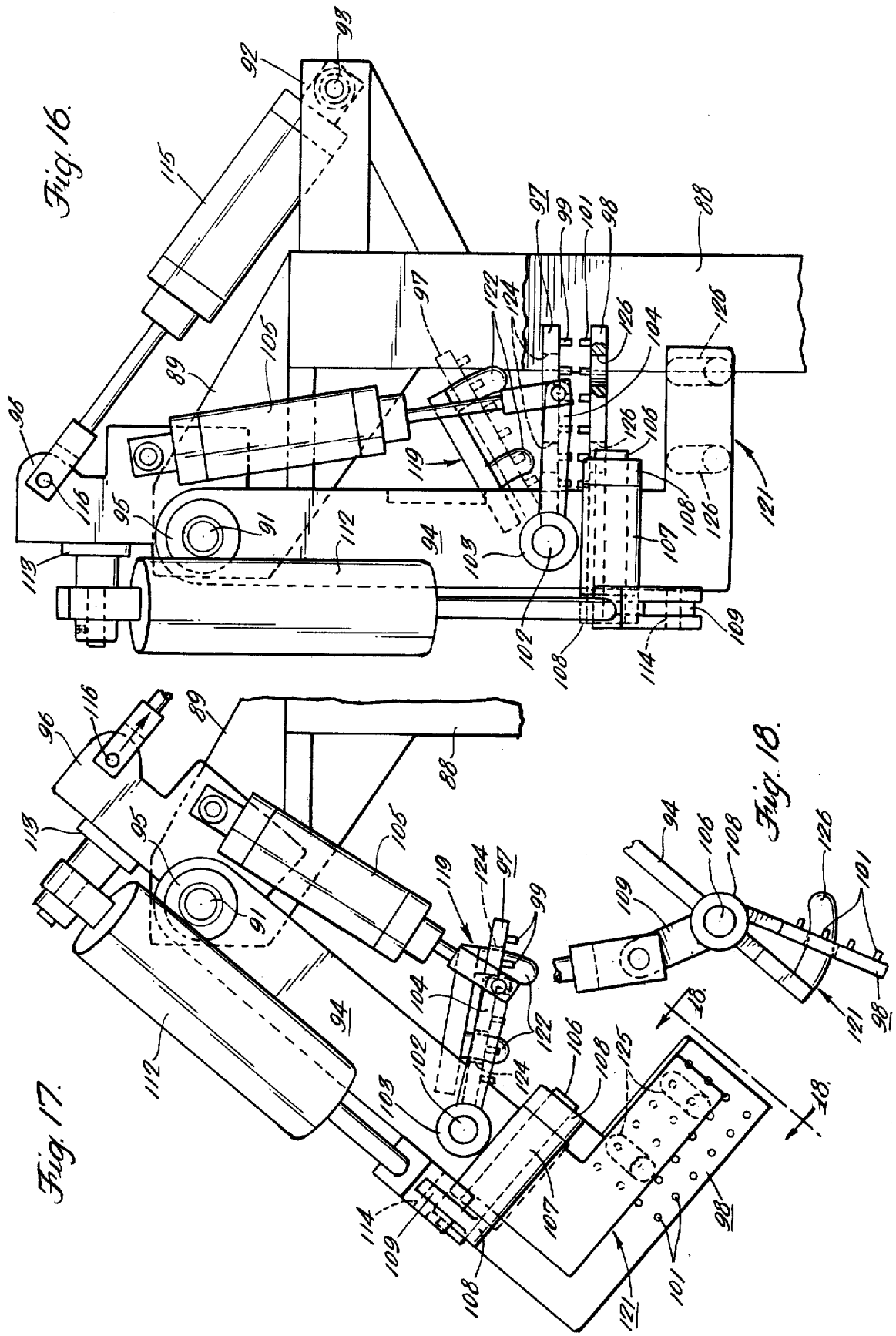

APPARATUS AND PROCESS FOR CUTTING CHICKEN

The present invention relates to new and useful improvements in apparatus and processes for removing the wings, legs, thighs and breast components of a chicken from the chicken carcass and more particularly to apparatus and processes which will accomplish this removal of component parts of the chicken accurately and neatly, by cutting and/or pulling the wings, legs and thighs at their respective joints and by gripping and pulling the breast away from the chicken carcass so that the bones of the chicken are not cut or splintered.

Prior to the present invention, if it was desired to carefully remove the wings, thighs and breasts of a chicken without cutting or splintering the bones it was necessary to employ considerable manual labor to cut and remove at least most of the component parts of the chicken by hand. Some apparatus has been available to split a chicken in half and to do some of the cutting of the chicken automatically. Other apparatus has been used which will cut chicken components indiscriminately without regard to accurate cutting of the chicken at the joints. The use of this apparatus results, for example, in slicing through a leg bone or other bone of the chicken at a point other than at the joint, or cutting a portion of the breast of the chicken while attempting to remove the wings, or the thighs. The resulting segments are thus defective in that they include more or less meat than should be included on the chicken part and also contain fragmented or splintered bones. For large scale commercial chicken processing applications where it is desired to produce a quality product, manual cutting of a chicken is undesirable because of the excessive labor cost and apparatus which can accurately and properly cut chicken into its component parts without fragmenting or splintering the bones is necessary.

With the foregoing in mind, a primary object of the present invention is to provide novel apparatus and processes to accurately and properly cut or remove wings, legs, thighs and breast from a chicken carcass without cutting or splintering the bones of the carcass and utilizing a minimum of manual labor.

Another object of the present invention is to provide apparatus of the type described herein which will separate the wings, legs, thighs and breasts of a chicken and collect each of the component parts and feed groups of the component parts separately to further processing or inspection stations.

A further object of the present invention is to provide novel apparatus of this type which includes novel mechanical feeding mechanism to properly position the carcass and feed it into the cutting machine.

A still further object of the present invention is to provide an apparatus of this type a novel mechanical device which will grip and pull the breast portion of the chicken from the carcass leaving the rib cage attached to the carcass.

An additional object of the present invention is to provide novel apparatus of the type disclosed herein including improved means to position the legs of the carcass and properly locate the leg joint so that the legs may be cut away from the thighs at the juncture between the legs and the thighs.

A further object of the present invention is to provide improved means in apparatus of the type disclosed herein automatically cutting wings away from the carcass without cutting into the breast meat of the chicken.

Another object of the present invention is to provide improved means to partially cut through the thigh of a chicken carcass at the thigh joint and thereafter grip and twist and pull the thigh from the carcass to avoid cutting the thigh bone or the pelvic bone of the carcass for the purpose of preventing the formation of bone chips and splinters.

A still further object of the present invention is to provide novel apparatus of the type described herein having calibrated adjusting means to facilitate setting of the machine to properly handle carcasses of different size groups.

A still further object of the present invention is to provide novel apparatus having the features and characteristics set forth above which is of relatively simplified construction, is easy to maintain, adjust and clean, and is entirely efficient and effective in operation and use.

These and other objects of the present invention and the various features and details of the operation and construction thereof are hereinafter more fully set forth and described with reference to the accompanying drawings, in which:

FIG. 1 is a block diagram illustrating the general interrelation of the major component parts of the apparatus and the order of the steps performed in cutting a chicken according to the present invention.

FIGS. 2a and 2b, taken together, illustrate a side elevational view of the apparatus of the present invention with certain component parts of the apparatus of the present invention shown more or less diagrammatically;

FIGS. 3a and 3b, taken together, illustrate a plan view of the apparatus of FIGS. 2a and 2b;

FIG. 4 is a perspective view of the chicken engaging and feed fingers of the infeed conveying portion of the apparatus;

FIG. 5 is an enlarged side elevational view of the breast pulling mechanism of the apparatus of the present invention;

FIG. 6 is a plan view of the apparatus illustrated in FIG. 5;

FIG. 7 is an end view of the jaws of the breast pulling mechanism as viewed along lines 7—7, FIG. 5;

FIG. 8 is an enlarged side elevational view of the leg or drumstick cutting portion of the apparatus of the present invention;

FIG. 9 is a plan view of the mechanism shown in FIG. 8;

FIG. 10 is a fragmentary transverse sectional view of the conveying mechanism at the leg cutter taken along line 10—10, FIG. 8;

FIG. 11 is a fragmentary transverse sectional view of the apparatus for partially cutting the thighs of the chicken taken along the line 11—11, FIG. 2b;

FIG. 12 is a side elevational view of the thigh cutting mechanism shown in FIG. 11 as viewed from the line 12—12, FIG. 11;

FIG. 13 is an enlarged fragmentary transverse view of the mechanism for gripping and twisting and pulling the partially cut thigh away from the chicken carcass taken along the line 13—13, FIG. 2b;

FIG. 14 is a sectional view of the upper jaw mechanism of the thigh pulling apparatus taken along 14—14, FIG. 13;

FIG. 15 is a view of the lower jaw mechanism of the thigh pulling apparatus taken along line 15—15, FIG. 13;

FIG. 16 is an elevational view of the thigh pulling mechanism of FIG. 13 as viewed from the line 16—16, FIG. 13;

FIG. 17 is a view similar to FIG. 16 with the thigh pulling mechanism moved outwardly away from the position as shown in FIG. 16 and with the jaws of the mechanism open; and FIG. 18 is a fragmentary plan view taken along line 18—18, FIG. 17.

Figure 1:
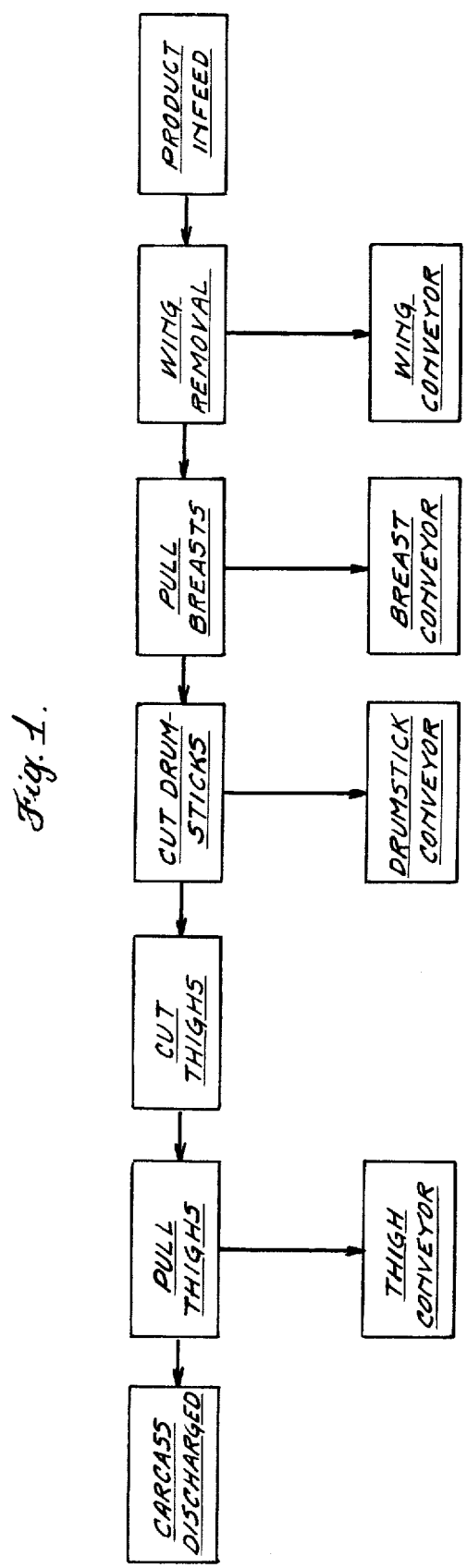

Chickens to be processed by the apparatus disclosed herein comprise whole carcasses which have been dressed and eviscerated and are delivered to the infeed end of the apparatus by conventional poultry conveyors which support the chicken in a hanging position. The chickens are placed on this poultry conveyor (not shown) as they are removed from the conventional aging and holding tanks. These chickens are inspected and prepared for cutting by the apparatus of the present invention by manually scoring the skin of the carcass while it is suspended from the poultry conveyor so that appropriate portions of the skin are removed along with the various parts of the chicken.

In operation, the carcasses are removed from the poultry conveyor and manually positioned on infeed conveying mechanism of this apparatus in a breast-down, tail-end forward position. FIG. 1 illustrates in a block diagram the order of the various operations performed on the chicken. As shown in FIG. 1, the whole chicken carcass is fed into the apparatus on an infeed conveyor and the first operation performed on the chicken is the removal of the wings with the wings thereupon being fed or dropped downwardly onto a wing conveyor which carries the wings away from the apparatus to further processing equipment. Thereafter, the breasts of the chicken carcass are grabbed and pulled away from the carcass and are placed onto a breast conveyor. As the next step, the drumsticks are positioned and cut away from the thighs fed or dropped onto a drumstick conveyor. Thereafter, the thighs are partially cut at the thigh joint. As a final step in treatment of the chicken carcass, the thighs are gripped and simultaneously twisted and pulled to remove the thighs from the carcass with the thighs thereupon being fed or dropped onto a thigh conveyor. The remaining portion of the carcass consisting of the backbone and the rib cage is then discharged from the apparatus of the present invention either into a container or onto a conveyor which will collect and carry away the carcass.

Referring more specifically to the drawings, the apparatus of the present invention comprises an infeed conveyor section 20 as shown at the right-hand side of FIGS. 2a and 3a on which the previously prepared chickens are placed and a main conveying and cutting section 21 where the above-described cutting and pulling steps are performed. Extending lengthwise of the apparatus from the infeed end to the carcass discharge end is a guide rod 22 which directs and positions the chickens being conveyed through the apparatus. The guide rod 22 is mounted in a cantilever manner from the main frame 23 for the apparatus at the carcass discharge end of the apparatus and projects in a horizontal direction toward the infeed end with an intermediate support 24 being provided at a position just past the breast pulling mechanism, more fully described hereinafter.

Chickens arriving at the apparatus are manually positioned on the guide rod 22 at the infeed conveyor section 20 in the previously described breast-down, tail-end forward position. In this position, the guide rod 22 enters the body cavity of the chicken at the vent opening, passes beneath the backbone of the chicken and pierces through the neck opening of the chicken formed by the removal of the crop. The guide rod 22 consists of a pair of relatively thin flat rods secured together lengthwise in an upwardly opening V-shape, as best shown in FIG. 10. A rounded nose portion 25 is provided at the leading end of the guide rod to facilitate placing the chickens on the guide rod.

After the chicken is placed on the guide rod as described it is engaged and moved forward along the infeed conveyor section by a feed member 26 carrried by a pair of spaced parallel infeed conveyor chains 27. The infeed conveyor chains pass over drive sprockets 28 driven by a drive chain 29 from the main chicken conveyor 30, more fully described hereinafter so that the main conveyor 30 and the infeed conveyor travel at the same speed.

As the chickens are placed on the infeed conveyor, the wings are positioned to pass over infeed guide bars 31, 31 mounted at opposite sides of the guide rod 22 and extending in a direction parallel to the guide rod 22 at approximately the same vertical level as the guide rod. The guide bars 31, 31 hold the wings of the chicken in position for the wing cutting operation.

Continued forward movement of the infeed conveyor directs the chickens to the feed end of the main chicken conveyor 30 which consists of an endless toothed chain having its lower run moving in the same direction and same speed as the infeed conveyor with the teeth of the lower run of the chain positioned centrally of the V portion of the guide rod 22. The upwardly extending fingers of the feed member 26 force the chickens beneath the teeth of the main chicken conveyor so that the chicken is firmly gripped by the main feed conveyor between the teeth on the lower run and the guide rod 22. Thus, further forward movement of the chickens is controlled by the main chicken conveyor 30 while the feed member 26 of the infeed conveyor drops downwardly away from the chickens.

The chickens, in this breast-down, tail-end forward position with the wings positioned over the infeed guide bars are thus presented to the wing-cutting mechanism, designated generally as 32. The wing-cutting mechanism 32 consists of a pair of continuously rotating circular cutting blades 33, 33 driven by electric motors 34, 34. Each motor 34 is supported by a pivoted carriage 35 mounted to pivot about a vertical axis 36. Pivotal movement of each carriage 35 is controlled by means of a hydraulic cylinder 37 having one end thereof interconnected with the frame 23 end and the end of its piston rod connected to a lever secured to the carriage 35. The motors 34 are adjustably carried by the carriages 35 for movement longitudinally of the carriages so that the cutting blades may be moved inwardly or outwardly toward or away from the chickens moving along the guide rod 22. An adjusting knob 38 is provided to permit adjustment of the position of the cutting blades 33 relative to the chickens carried along the guide rod 22.

At the beginning of the wing cutting operation, the carriages for the motors are pivoted away from the main chicken conveyor 30 and the guide rod 22 so that the cutting blades 33 are in the positions as shown in dotted lines in FIG. 3a. The chickens move forward past the wing cutting mechanism 32 with the cutting blade 33 continuously rotating and retracted to a position where the thighs and the main portion of the breast of the chicken is past the cutting blades. At this time, the chicken will engage a microswitch 39 which will complete a circuit and cause hydraulic fluid under pressure to be admitted to the cylinders 37 thereby moving the pistons of the cylinders forward and rotating the motor carriages and cuttin blades inwardly toward the chicken so that the cutting blades will engage and cut the wings away from the chicken carcass at the wing joint without cutting the breast meat of the chicken. It should be understood that while the cylinders 37 have been described as hydraulic cylinders, this term also includes air operated cylinders.

It should be observed, that in the normal operation of processing chickens a large commercial chicken processor will process a great number of chickens as a group which are the same size, age and weight. After a particular batch of uniform size, age and weight chickens are processed, the processor will thereafter switch to a different size chicken. Thus, all of the chickens passing through this chicken cutting apparatus at one given time would be of the same size, age and weight so that the wing-cutting mechanism and other portions of the chicken cutting apparatus may be adjusted to the proper position for performing a particular operation accurately on the size chickens passing through the apparatus. Thus, indexing means may be provided on the adjusting knobs 38 and the cutting blades 33 adjusted properly to cut the chicken wings at the wing joint. The same adjustment applies for all of the later described cutting operations where it is necessary to adjust cutting blades in accordance with the size of the chickens in the particular batch being processed.

After the wings are cut away from the carcass of the chicken the wings will drop downwardly onto a wing conveyor 41 which will carry all of the wings away from the apparatus to further processing equipment. The chickens will continue along the guide rod 22, being moved by the main chicken conveyor 30 to the breast pulling mechanism, designated generally as 42.

The breast pulling mechanism is illustrated in FIGS. 2b, 3b, 5, 6 and 7 and includes movable gripping mechanism, including upper and lower jaws 43 and 44 respectively which will first engage and grip the breast portion of the chicken and thereafter be moved downwardly to pull the breast away from the chicken carcass and drop the chicken breasts onto the breast conveyor 45.

The breast pulling jaws 43 and 44 are carried by a breast pulling frame 46 pivotally mounted as indicated at 47, 47 between opposite side rails of the machine frame 23. The breast pulling frame 46 includes a cross frame member 48 which extends between the side rails of the machine frame 23 and carried at its mid-point a forwardly extending braced arm 49. Additionally, an operating arm 51 extends angularly downward from the cross frame member. At the forward end of the braced arm 49 is an upwardly extending jaw support member 52 to which the upper jaw 43 is fixed. The lower jaw 44 which includes a pair of curved longitudinally extending fingers is pivotally connected to the jaw support member 52 as indicated at 53 for pivotal movement toward and away from the upper jaw.

In accordance with the present invention, the jaws 43 and 44 are operated to first grip the breast portion of the chicken being moved along the guide rod 22 by the main conveyor 30 and thereafter pull the breast portion of the chicken downwardly away from the carcass and deposit the same on the breast conveyor 45. To accomplish this, a hydraulic cylinder 54 is provided to cause pivotal movement of the lower jaw 44 relative to the upper jaw 43. This hydraulic cylinder 54 is connected to the braced arm 49 and has the forward end of its piston rod connected to a pivoted toggle 55. The toggle 55 in turn is interconnected by means of a link 56 to the lower jaw 44 as indicated at 57. When fluid under pressure is admitted to the forward end of the cylinder 54 the toggle plate 55 is pivoted in the clockwise direction about its pivot point 58 thereby moving the lower jaw 44 downwardly away from the upper jaw. Similarly, when hydraulic fluid under pressure is admitted to the rearward end of the cylinder 54 the lower jaw is caused to move upwardly toward the upper jaw. It is in this position of the upper jaw that the jaws are caused to grasp the chicken breast.

Movement of the entire breast support frame 46 is caused by a hydraulic cylinder 59 which is connected at one end to the main frame 23 with the forward end of its piston rod pivotally connected to the operating arm 51. As the piston of the cylinder 59 is moved to the left with respect to FIG. 5 by admission of hydraulic fluid under pressure to the rearward end of the hydraulic cylinder 59 the entire frame 46 is pivoted in the clockwise direction relative to FIG. 5 to the position as shown in broken lines thus pulling both the upper and lower jaws downwardly.

In normal operation of the breast pulling mechanism, the breast pulling frame 46 is in its upper or horizontal position with the upper jaw in its uppermost position immediately beneath the guide rod 22, as shown in FIG. 2b, and the lower jaw is pivoted downwardly to the position as shown in dotted lines in FIG. 2b so that the jaws are open. As a chicken is moved along the guide rod 22 by the conveyor 30, the upper jaw enters the body cavity of the chicken through the vent opening at the tail of the chicken. As the chicken continues forward after the upper jaw has entered the body cavity, the chicken engages the breast pulling microswitch 61, completing a circuit which causes actuation of the hydraulic cylinders 54 and 59. When the microswitch is engaged by the chicken, the cylinder 54 is first actuated causing the lower jaw 44 to move upwardly to a position wherein the breast of the chicken is firmly engaged by the jaws 43 and 44. Immediately thereafter, the hydraulic cylinder 59 is actuated to pivot the breast pulling frame 46 downwardly thereby causing the jaws 43 and 44 to pull the breast portion of the chicken away from the carcass as a single piece. When the breast pulling frame reaches its lowermost position, the hydraulic cylinder 54 is again actuated to open the jaws and permit the chicken breast to fall onto the breast conveyor 45. Thereafter the hydraulic cylinder 59 returns the jaws to their uppermost position and in this position the jaws are ready to start another cycle of operation as soon as another chicken engages the microswitch 61.

In order to insure that the chicken is positively moved forward by the conveying mechanism while the breast pulling operation is being performed on the chicken, a pair of idler sprockets 62, 62 are provided which bear against the inner surface of the lower run of the main chicken conveying chain 30 and force the teeth of this chain downwardly against the carcass of the chicken adjacent the backbone of the chicken. These idler sprockets 60 are carried by arms 62, 62 which are fixedly secured to a pair of transversly extending shafts 63, 63 respectively, which are rotatably mounted in upwardly extending projections 64, 64 of the main machine frame 23. Depending arms 62a, 62a also secured to the shafts 63 are connected at their outer extremities by a tension spring 65 to normally force the idler sprockets 62, 62 downwardly into engagement with the lower run of the conveyor chain 30, as shown in FIG. 2b and urge the conveyor 30 downwardly.

Continued further movement of the chicken carcass after completion of the breast pulling mechanism moves the carcass to the leg cutting section of the apparatus wherein the legs or drumsticks of the chicken are cut away from the thighs. With reference to FIGS. 8 and 9, as the chickens are moved forward along the guide rod 22 by the main conveyor 30, the lower ends of the legs are engaged between inner and outer guide bars 66 and 67 respectively which function to direct the legs in the proper position toward the cutting mechanism. These inner and outer guide bars 66 and 67 are inclined downwardly away from the main guide rod 22, relative to the direction of movement of the chickens along the guide rod with the outer guide bars 67 converging inwardly toward the inner guide bars 66. These guide bars 66 and 67 together serve to draw the legs of the chicken downwardly toward a vertical position.

As the legs approach the leg cutting mechanism, the inner edges of the lower portions of each of the legs are engaged by a pair of generally horizontally extending cutting guide bars 68 carried by brackets 69, 69 depending downwardly from the lower surface of the guide rod 22. At the same time, the outer edges of the legs to be cut are engaged by a pair of moving toothed conveyors 71, 71 which lie in a horizontal plane slightly above the cutting guide bars 68. These toothed conveyors 71, 71 may be formed of an endless chain similar to the chain of the main chicken conveyor 30 having sharpened teeth thereon projecting outwardly toward the chicken legs passing between the conveyors. The conveyors 71, 71 pass over continuously driven drive sprockets 72, 72 mounted on a cross frame member 73 extending between side rails of the main frame 23 with the drive sprockets 72 being driven from common drive means for the main chicken conveyor 30 so that the inner runs of the conveyors 71, 71 travel in the same direction and at the same speed as the main conveyor 30. Idler sprockets at the rear of the conveyor 71, 71 are carried by pivoted arms 74, 74 held in position by adjustable tie rods 75, 75 as shown in FIG. 9.

With this above construction, the chicken legs are held in a vertical position and moved forwardly along with the chicken carcass to adjustable cutting blades 76, 76 which serve to cut the chicken legs away from the thigh bone at the joint between the legs and the thighs. The cutting blades 76 are driven by continuously operating motors 77 adjustably mounted in a motor support bracket 78 with adjusting knobs 79 being provided to permit axial adjustment of the position of the motors and their associated cutting blades. The position of these cutting blades is adjusted at the start of the operation of the apparatus of the present invention in accordance with the size of the chickens being processed by the apparatus so that the cutting blades will cut the chicken legs at the proper location. After the legs are cut by the cutting blade 76 they fall downwardly onto a leg conveyor 81 which carries the legs away to further processing apparatus.

After the chickens leave the leg cutting mechanism they are conveyed to the thigh cutting and pulling mechanism to complete the cutting apart of the chickens into their component parts. As the first step in removal of the thighs from the carcass, the thighs are partially cut through by a pair of continuously rotating cutting blades 82, 82 driven by motors 83, 83 with each motor individually mounted on an adjustable motor support 84. Adjusting knobs 85 are provided to adjust the position of the motor, causing the motor to swing or pivot about pivot points 86. The position of the cutting blades 82 is adjusted according to the size of the chickens being processed on the apparatus so that the blades will cut through the meat of the thigh adjacent the juncture between the thigh and the body but will not cut completely through the thigh joint.

Continued further movement of the main chicken conveyor 30 will convey the chicken carcasses with the partially cut thighs to the thigh pulling mechanism, designated generally as 86. The position of this thigh pulling mechanism is shown in dot and dash lines in FIGS. 2b and 3b while details of the construction operation of the thigh pulling mechanism is shown in FIGS. 13 to 18 inclusive of the drawings. In FIGS. 13 to 18 inclusive only one thigh pulling mechanism is illustrated. However, both thighs are pulled away from the carcass at the same time and there are similar thigh pulling mechanisms provided, one for each thigh, with the thigh pulling mechanism not shown being the mirror image of the one shown and described herein.

The object of the thigh pulling mechanism of the present invention is to grip the thigh of the chicken after the thigh joint has been partially cut, for example, but approximately one-half way through, and pull and twist the thigh bone and attached meat downwardly and outwardly away from the carcass while the carcass is moving along the guide rod 22. This will cause the meat of the thigh which is also attached along the back of the chicken to be pulled away from the back of the chicken so that all of the thigh meat is removed at the same time.

Referring to the drawings, a support frame is provided for the thigh pulling mechanism with the support frame shown in FIGS. 2b and 3b with no other mechanism attached to it. The support frame includes a vertically extending box-shaped frame member 88 secured to the side rails of the main frame 23. A first bracket portion 89 extends angularly upward from this frame member 88 in a direction toward the discharge end of the machine and has secured to it a downwardly and outwardly extending mounting stud 91 about the axis of which the entire thigh pulling mechanism rotates, as more fully described hereinafter. A second bracket portion 92 extends from the frame 88 in a direction toward the feed end of the machine and carries a stub shaft 93 to which the hydraulic cylinder which controls movement of the thigh pulling mechanism is connected, also more fully described hereinafter.

The thigh pulling mechanism itself includes a jaw support arm 94 as shown in FIGS. 13, 16 and 17 which is pivotally mounted by means of a sleeve 95 on the angularly inclined mounting stud 91. An upward extension 96 is secured to the jaw support arm and is movable with the arm about the axis of the stud 91. This jaw support arm 94 carries both the upper jaw 97 and the lower jaw 98 of the thigh pulling mechanism together with the means for mounting, pivoting and stripping the jaws. The upper jaw 97 consists of a flat plate as shown in FIG. 14 having a series of downwardly extending gripping fingers 99 thereon which engage and grip the meat of the thigh. Similarly, the lower jaw 98 is shown in FIG. 15 and also consists of a flat plate having a series of upwardly extending gripping fingers 101 thereon which engage and grip the meat of the thigh during the thigh pulling operation.

The upper jaw 97 is secured to a rock shaft 102 which extends through mounting bosses 103 on the jaw support arm 94 in a direction parallel to the axis of the thigh pulling mechanism mounting stud 91 and a crank arm 104 is fixed to the outer end of the rock shaft 102 at the opposite side of the bosses 103 from the jaw 97. Movement of the upper jaw is controlled by means of a hydraulic cylinder 105 which is pivotally secured at its upper end to the upward extension 96 of the jaw support arm 94 and which has the outer end of its piston pivotally connected to the outer end of the crank arm 104, as shown in FIGS. 16 and 17. In FIG. 16 the piston of the hydraulic cylinder 105 is extended and the upper jaw is shown in its normal closed position, which is the position the upper jaw is in at the start of the thigh pulling operation. In FIG. 17, the upper jaw is shown in its open position, being pivoted in the counter-clockwise direction about the axis of the rock shaft 102.

The lower jaw 98 is carried by the support arm 94 for pivotal movement about an axis extending in a direction normal to the axis of the upper jaw 97. Thus, a lower jaw mounting shaft 106 extends through an enlarged boss portion 107 at the lower end of the jaw support arm 94, with bearing portions 108, 108 projecting outwardly from the lower jaw 98 and receiving the ends of the mounting shaft 106. A crank arm 109 is secured to the bearing portion 108 for the lower jaw, for example as shown in FIG. 13. In order to cause pivotal movement of the lower jaw, a hydraulic cylinder 112 is provided which has its upper end pivotally secured to an arm 113 projecting outwardly from the upper end of the support extension 96. The outer end of the piston of the cylinder 112 is pivotally connected to the end of the crank arm 109 as shown at 114 in FIG. 13. In FIGS. 13 and 16, the lower jaw 98 is shown in its closed or thigh gripping position whereas, the lower jaw normally will be in its open or retracted position at the start of the thigh pulling operation. Upon the admission of fluid under pressure to the lower end of the lower jaw cylinder 112 the lower jaw is caused to pivot in a clockwise direction relative to FIG. 13 toward its open position.

As set forth previously, the jaw support arm 94 is mounted for pivotal movement about the axis of the mounting stud 91 for the thigh pulling mechanism. Pivotal movement of the jaw support arm 94 is caused after the upper and lower jaws 97 and 98 have been actuated to grip the chicken thigh. To control movement of the jaw support arm, a hydraulic cylinder 115 is provided with the lower end of the cylinder pivotally connected to the previously described stub shaft 93. The outer end of the piston rod for the cylinder 115 is pivotally connected as indicated at 116 to the upward extension 96 of the jaw support arm 94. Upon admission of hydraulic fluid under pressure to the forward end of the cylinder 115 the piston rod of the cylinder 115 is moved to the right with respect to FIG. 16 thereby pivoting the jaw support arm in the clockwise direction about the axis of the mounting stud 91 to the position as shown in FIG. 17. It is this pivotal movement of the jaw support arm after the upper and lower jaws have been caused to grip the chicken thigh which causes the twisting and pulling movement to the thigh and pulls the thigh away from the backbone of the chicken carcass.

At the beginning of a cycle of operation of the thigh pulling mechanism of this invention, the upper jaw is in its closed position, the lower jaw is in its open position and the jaw support arm is in the position as shown in FIGS. 13 and 16. The relative position of the upper jaw 97 with respect to the chicken carcass guide rod 22 and main conveyor 30 is shown in FIG. 13. As a chicken thigh is moved into position immediately beneath the upper jaw 97, the chicken engages and closes the thigh pulling microswitch 117 which starts the cycle of operation of the thigh pulling mechanism. Immediately upon engagement of the microswitch 117 by a chicken, the lower jaw 98 is moved to its closed position firmly gripping the thigh of the chicken between the upper and lower jaws. Thereafter, the cylinder 115 is actuated to cause the jaws 97 and 98 to move along with the jaw support arm 94 in a direction downwardly and away from the carcass of the chicken positioned on the guide rod 22. After the support arm 94 has been moved to its retracted position as shown in FIG. 17, the hydraulic cylinders 105 and 112 are actuated to move the upper and lower jaws respectively toward their open position thereby releasing the chicken thigh and permitting the thigh to drop downwardly onto the thigh conveyor 118. Thereafter, the upper jaw 97 is moved to its closed position and the jaw support arm 94 is moved back to its position as shown in FIG. 16 preparing the thigh pulling mechanism for a second cycle of operation.

In order to insure that the chicken thigh is released by the jaws 97 and 98, upper and lower jaw strippers 119 and 121 respectively are provided. The upper jaw stripper 119 consists of a pair of arcuate fingers 122 secured to a bracket 123 carried by the jaw support arm 94 in a position above the upper jaw and in the path of travel of the upper jaw. These stripping fingers pass through openings 124 in the upper jaw as the upper jaw is moved to its open position and will engage and force the chicken thigh away from the upper jaw. Similarly, the lower jaw stripper 121 consists of a pair of arcuate fingers 125 secured to the lower end of the jaw support arm 94 in the path of travel of movement of the lower jaw 98 to its open position. These fingers 125 will pass through openings 126 in the lower jaw when the lower jaw is moved to its open position and force the chicken thigh away from the lower jaw. With this construction, as the jaws open the stripper fingers will cause the thigh which has been pulled away from the carcass to be dropped downwardly onto the thigh conveyor 118.

Upon continued forward movement of the chicken carcass after the thighs have been pulled away from the carcass, the carcass approaches the discharge end of the chicken conveyor 30 and is discharged from the machine into a suitable container, for example, as shown at 127 in FIG. 2b. The carcass that remains after the above described operations have been performed on it will normally consist of the backbone with most of the ribs attached to the backbone and most, if not all, of the meat of the chicken removed from the carcass.

From the foregoing it will be observed that the present invention provides novel apparatus for processing a chicken which will cut and remove the wings from the chicken, pull the breast as a single piece away from the chicken, cut the legs away from the chicken and thereafter cut and pull the thighs away from the remaining chicken carcass and which will accomplish this without cutting or splintering the bones of the carcass. Additionally, it will be observed that the present invention provides a novel process for neatly and accurately dividing a chicken into its component parts of wings, legs, thighs and breasts in a rapid and efficient manner.

While a particular embodiment of the present invention has been illustrated and described herein it is not intended to limit the invention to such a disclosure and changes and modifications may be incorporated and embodied herein within the scope of the following claims.

I claim:

1. A process for separating chickens into their usable components of wings, breasts, legs and thighs, comprising the following steps: conveying the chickens at regular intervals along conveying means, cutting the wings away from the chicken carcass at the wing joint in a direction from the tail and of the chicken toward the neck by movable rotating cutting blades, gripping the breast of the chicken and thereafter pulling the breast in one piece away from the carcass, cutting the legs of the chicken away from the thighs at the leg joints by rotating cutting blades, partially cutting the thigh joint of the chicken in a direction from the breast toward the backbone by rotating cutting blades, gripping the meat of the thighs and thereafter pulling the thighs away from the chicken carcass breaking the connection at the partially severed thigh joint, and discharging the remaining carcass from the conveying means.

2. A process according to claim 1 in which said chickens are conveyed in a breast-down, tail-end forward position.

3. A process according to claim 2 in which said chickens are whole-dressed and eviscerated chickens having a previously prepared vent opening at the tail end thereof.

4. A process according to claim 3 in which the breast is removed from the chicken carcass by gripping the breast between a pair of movable jaws, one jaw entering the vent opening and engaging against the inner side of the breast and the other jaw engaging against the outer side of the breast.

5. A process according to claim 4 in which the breast is pulled downwardly by the jaws away from the backbone after the breast is gripped by the jaws.

6. A process according to claim 2 in which the thighs are gripped by movable jaws and pulled downwardly and outwardly away from the backbone after the thigh joint is partially cut.

7. Apparatus for separating chickens into their usable components of wings, breasts, legs and thighs comprising; conveying means to advance the chickens along a predetermined path; wing-cutting means to cut the wings off of the chicken carcass at the wing joints, said wing-cutting means including a pair of rotatable wing-cutting blades at opposite sides of said predetermined path, and means mounting said wing-cutting blades for movement toward and away from said predetermined path to cut the chicken carcass at the wing joints as a chicken moves along said predetermined path past said wing-cutting means; breast-pulling means operable to grip and remove the breast from a chicken conveyed by said conveying means, said breast-pulling means including a pair of opposed jaw members supported adjacent said predetermined path, and actuating means for said jaw member to cause said jaws to grip the breast of a chicken conveyed past said breast-pulling means and pull the breast away from the chicken carcass; leg-cutting means to cut the legs off of the chicken carcass at the joint between the legs and the thighs, said leg-cutting means including at least one rotatable leg-cutting blade in the path of travel of the chicken conveyed by said conveying means; and thigh-removal means operable to cut and remove the thighs from the chicken carcass, said thigh-removal means including a pair of rotatable thigh-cutting blades mounted at opposite sides of said predetermined path of travel of the chickens and operable to engage and cut into a chicken carcass at the thigh joints and at least partially cut said thigh joints, a pair of opposed thigh-gripping jaw members mounted at opposite sides of said predetermined path of travel adjacent said thigh-cutting blades, and actuating means for said pairs of thigh-gripping jaw members to cause the same to grip the thighs and pull the thighs away from the chicken carcass.

8. Apparatus in accordance with claim 7 including an infeed conveyor having a feed end on which the chickens are initially placed operable to feed said chickens to said conveying means, said infeed conveyor including a drive member having a plurality of chicken-engaging means thereon spaced at uniform predetermined intervals to feed said chickens to said conveying means at uniform spaced intervals.

9. Apparatus in accordance with claim 8 including support means associated with said conveying means to hold said chickens while they are advanced by said conveying means, said support means comprising a cantilever mounted guide rod extending the full length of said predetermined path of travel of said chickens and having a free end terminating at the feed end of said infeed conveyor, said chickens adapted to be placed over said guide rod in a breast-down, tail-end forward position with the guide rod extending through the body cavity of said chickens.

10. Apparatus in accordance with claim 9 in which said conveying means includes an endless conveyor chain having a lower run traveling in a direction away from said infeed conveyor immediately above said guide rod, and a plurality of teeth on said conveyor chain engaging against the chickens on said guide rod to move said chickens along said guide rod.

11. Apparatus in accordance with claim 7 including a plurality of separate collecting means to separately collect the wings, breasts, legs and thighs removed from the chicken and carry the same in a direction away from said predetermined path of travel of the chickens.

12. Apparatus in accordance with claim 7 in which said wing-cutting blades are mounted for rotation in a substantially vertical plane, and the means mounting said wing-cutting blades to move said cutting blades angularly inward from opposite sides of the chicken in a direction from the tail of the chicken toward the neck of the chicken to clear the breast of the chicken and cut the wings away from the chicken at the wing joints.

13. Apparatus in accordance with claim 12 in which the means mounting said wing-cutting blades include a pair of pivoted carriages adapted to pivot about substantially vertical axes to move said blades inwardly from opposite sides of the chicken, and adjusting means supported by said carriages to adjust the position of said blades relative to the predetermined path of travel of said chickens.

14. Apparatus in accordance with claim 7 including a movable frame support member mounting said breast-pulling jaw members, means carried by said frame support member to cause relative movement of said jaws toward and away from one another, said jaws adapted to grip a breast of the chicken as they move toward one another and release the breast of a chicken as they move away from one another, and means to move said frame support member in a direction away from the path of travel of said chicken after said jaws move toward one another and grip the breast of a chicken.

15. Apparatus in accordance with claim 14 in which said pair of opposed jaw members includes an upper jaw member fixed to said movable frame support member and a lower jaw member mounted for movement toward and away from said upper jaw member, said upper jaw member adapted to enter the body cavity of the chicken and engage against the inner side of the breast and said lower jaw member adapted to engage against the outer side of the breast to grip the breast of the chicken.

16. Apparatus in accordance with claim 7 in which said leg-cutting means includes guide means mounted adjacent the rotatable leg-cutting blade to direct the legs of the chicken into engagement with said leg-cutting blade.

17. Apparatus in accordance with claim 16 in which said guide means includes opposed guide rods inclined at an angle relative to the carcass of the chicken, and a movable conveyor member having teeth thereon adapted to engage and firmly hold said legs while they are being cut by the leg-cutting blade.

18. Apparatus in accordance with claim 17 in which said leg-cutting means includes a pair of rotatable leg-cutting blades mounted at opposite sides of the path of travel of said chicken and adjusting means to adjust the position of said cutting blades relative to said predetermined path of travel of said chicken to cut said legs away from the thighs at the joint between the legs and the thighs.

19. Apparatus in accordance with claim 7 in which the rotatable thigh-cutting blades are inclined relative to one another and extend in a direction toward the chicken moving along said predetermined path of travel, said thigh-cutting blades cutting into and partially through the thigh joint in a direction extending from the breast of the chicken toward the backbone of the chicken.

20. Apparatus in accordance with claim 19 including adjusting means to adjust the position of said thigh-cutting blades relative to one another and relative to the chicken being cut so that said thigh-cutting blades cut approximately one-half of the way through the thigh joints of the chicken.

21. Apparatus in accordance with claim 7 in which said pairs of opposed thigh-gripping jaw members are carried by movable arms, each arm mounting one pair of opposed thigh-gripping jaw members, means supported by said arms to move said thigh-gripping jaw members toward and away from one another to grip and release the thighs of the chickens, and means to move said arms in a direction away from said predetermined path of travel of said chickens after said thigh-gripping jaw members have moved toward one another to grip the thighs of a chicken.

22. Apparatus in accordance with claim 21 including means to move the opposed pairs of thigh-gripping jaw members away from one another after said movable arms have been moved away from the path of travel of the chickens to release the thigh members from said jaws, and stripping means adapted to strip the thighs from said jaws as said jaws move away from one another.

23. In apparatus for separating chicken into its components such as wings, legs, thighs and breasts including conveying means for conveying the chicken along a predetermined path, the improvements comprising: wing-cutting means to cut the wings off of the chicken carcass at the wing joints, said wing-cutting means including a pair of rotatable wing-cutting blades at opposite sides of said predetermined path, means mounting said cutting blades for movement toward and away from said predetermined path and means responsive to the chicken carcass reaching a predetermined position along said predetermined path for causing said cutting blades to move toward the chicken carcass to cut the chicken carcass at the wing joints as a chicken moves along said predetermined path past said wing-cutting means.

24. Apparatus in accordance with claim 23 including a pair of pivoted carriages adjustably mounting said rotatable wing-cutting blades adapted to move said wing-cutting blades along an arcuate path inwardly toward the chicken to be cut from opposite sides of the chicken in a direction from the tail end of the chicken toward the neck of the chicken to clear the breast of the chicken and cut the wings at the wing joints, and adjusting means on said carriages to adjust the position of said wing-cutting blades relative to a chicken moving along said predetermined path.

25. In apparatus for separating chicken into its components such as wings, legs, thighs and breasts including conveying means for conveying the chicken along a predetermined path, the improvement comprising; breast-pulling means operable to grip and remove the breast from the chicken conveyed by said conveying means along said predetermined path, said breast-pulling means including a pair of opposed jaw members supported adjacent said predetermined path, and actuating means for said jaw members to cause said jaws to grip the breast of a chicken conveyed along said predetermined path past said breast-pulling means and pull said breast away from the chicken carcass.

26. Apparatus in accordance with claim 25 including a movable support member mounting said breast-pulling jaw members, means carried by said support member to cause relative movement of said jaws toward and away from one another, said jaws adapted to grip the breast of the chicken, and means to move said support member in a direction away from said predetermined path after said jaws grip the breast of the chicken.

27. In apparatus for separating chicken into its components such as wings, legs, thighs and breasts including conveying means for conveying the chicken along a predetermined path, the improvement comprising: leg-cutting means to cut the legs off of the chicken carcass at the joint between the legs and the thighs, said leg-cutting means including at least one rotatable leg-cutting blade mounted in the path of travel of the chicken conveyed by said conveying means along said predetermined path, first guide means to engage and direct the legs of the chicken toward said leg-cutting blade and second guide means adjacent said first guide means for supporting the legs of the chicken while the legs are being cut.

28. Apparatus in accordance with claim 27 including a pair of leg-cutting blades adjustably mounted at opposite sides of said predetermined path of travel of the chicken, said first guide means including opposed stationary guide bars converging toward each other and extending away from said predetermined path toward said cutting blades to engage and move said chicken legs in a direction toward said leg-cutting blades, and said second guide means including stationary guide bars and movable toothed members to engage each of said legs adjacent said cutting blades and firmly support said legs against said cutting blades while the legs are being cut.

29. In apparatus for separating chicken into its components such as wings, legs, thighs and breasts including conveying means for conveying the chicken along a predetermined path, the improvement comprising; thigh-removal means operable to cut and remove the thighs from the chicken carcass, said thigh-removal means including a pair of rotatable thigh-cutting blades mounted at opposite sides of said predetermined path of travel of said chicken, said thigh-cutting blades operable to engage and cut into the chicken at the thigh joints and partially cut through said thigh joints, pairs of opposed thigh-gripping jaw members mounted at opposite sides of said predetermined path of travel of said chicken adjacent said thigh-cutting blades, and actuating means for said pairs of thigh-gripping jaw members to cause the jaw members to grip a thigh after it has been cut by said thigh-cutting blade and pull the same away from the chicken carcass.

30. Apparatus in accordance with claim 29 in which said thigh-cutting blades are angularly inclined with respect to one another and cut into the thigh joints in a direction extending from the breast of the chicken toward the backbone of the chicken, and a pair of movable arms with each arm mounting a pair of said opposed thigh-gripping jaw members, said jaw members mounted for movement toward and away from one another, and actuating means to first cause the opposed thigh-gripping jaws to move toward one another and grip a partially cut thigh and thereafter cause said arms to move away from said predetermined path of travel of said chicken to pull the partially cut thighs away from the chicken carcass.

* * * * *